Figure 1:
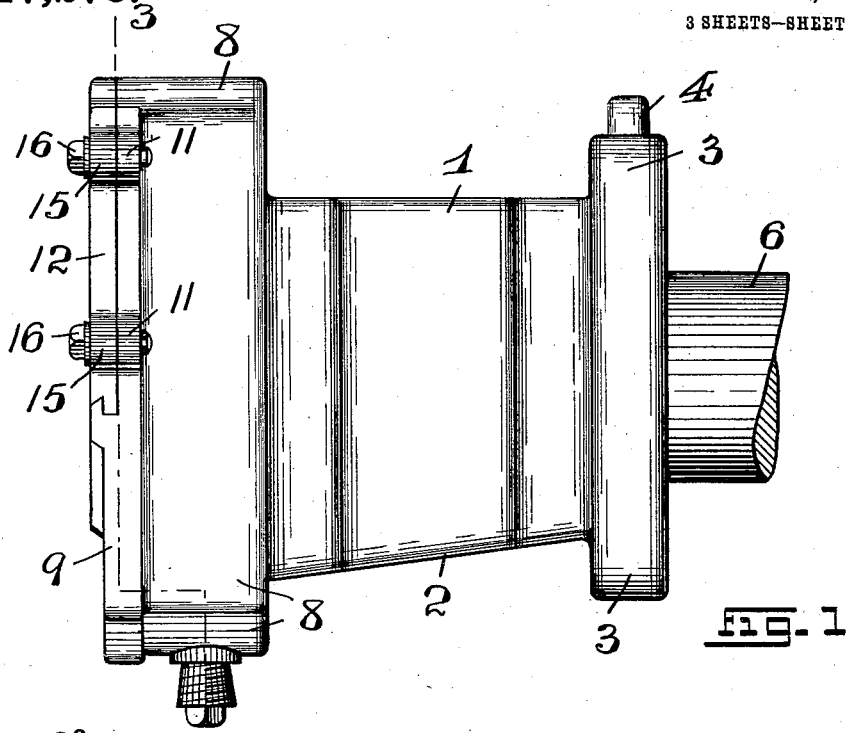

C. F. BEERS.
JOURNAL BOX.
APPLICATION FILED JAN. 12, 1911.

1,017,278.

Patented Feb. 13, 1912.
3 SHEETS—SHEET 1.

WITNESSES:
Harry E. Pfeiffer
Frioth H. W. Fraentzel

INVENTOR
Charles F. Beers.
BY
Fraentzel and Richards,
ATTORNEYS

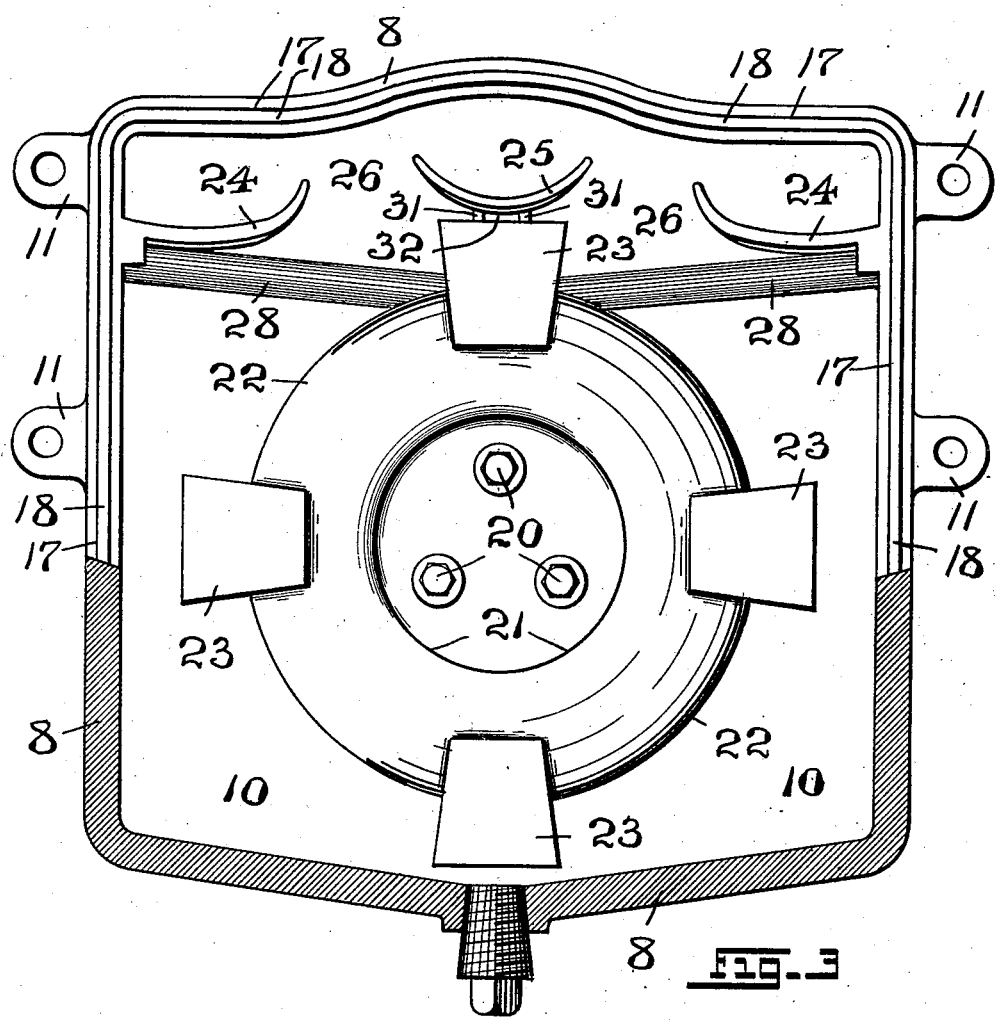

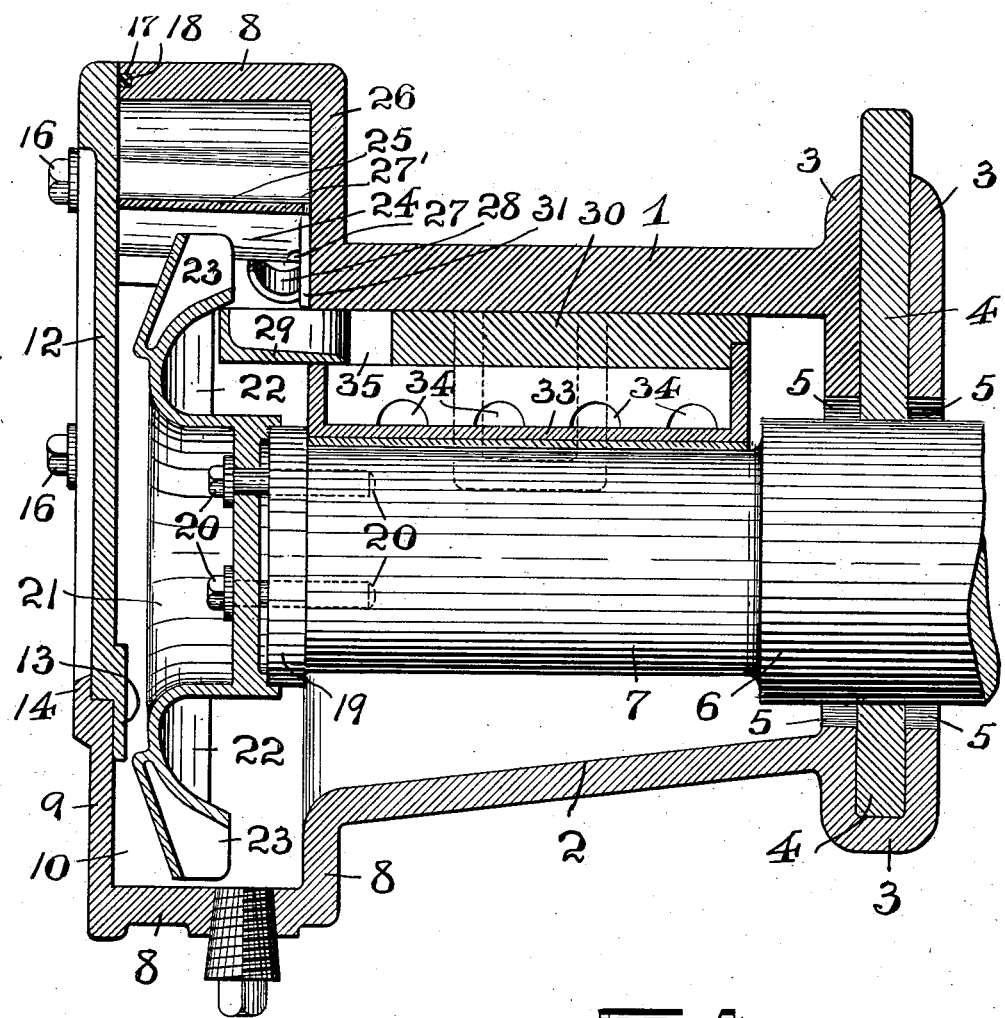

UNITED STATES PATENT OFFICE.

CHARLES F. BEERS, OF NEWARK, NEW JERSEY, ASSIGNOR OF ONE-THIRD TO JOHN HENSLER AND ONE-THIRD TO ADOLPH F. HENSLER, BOTH OF NEWARK, NEW JERSEY.

JOURNAL-BOX.

1,017,278.  Specification of Letters Patent.  Patented Feb. 13, 1912.

Application filed January 12, 1911. Serial No. 602,152.

*To all whom it may concern:*

Be it known that I, CHARLES F. BEERS, a citizen of the United States, residing at Newark, in the county of Essex and State of New Jersey, have invented certain new and useful Improvements in Journal-Boxes; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in self-oiling journal-boxes or bearings, and the same is peculiarly adapted for use as a self-oiling journal-box or bearing for the journals of car-axles; although it will be readily understood that the same may be adapted for use as a bearing for shafts of all kinds.

The present invention has for its principal object to provide in connection with a journal-box, a novel, simple and efficient means of lubrication for distributing the oil upon the cylindrical surface of a journal or shaft, so that the surface of the said journal or shaft will be thoroughly and constantly bathed with oil during its revolutions, no matter at what speed the said journal or shaft turns in its journal-box.

A further object of this invention is to provide in connection with a journal-box, a novel means for storing a portion of the lubricant in such a manner, as to provide a supply of lubricant which is located so that a continuous circulation of the same is the result and its flow is continued upon the journal or shaft, even when the latter is not in motion.

Other objects of the present invention not at this time more particularly enumerated, will be clearly understood from the following description of the same.

With the various objects of the present invention in view, the said invention consists, primarily, in the novel self-oiling journal-box or bearing hereinafter more fully set forth; and, furthermore, said invention consists in the various novel arrangements and combination of parts, as well as in the details of the construction of the same, all of which will be more fully and particularly described in the accompanying specification, and then finally embodied in the clauses of the claim which are appended to and which form an essential part of the said specification.

The invention is clearly illustrated in the accompanying drawings, in which:—

Figure 2:
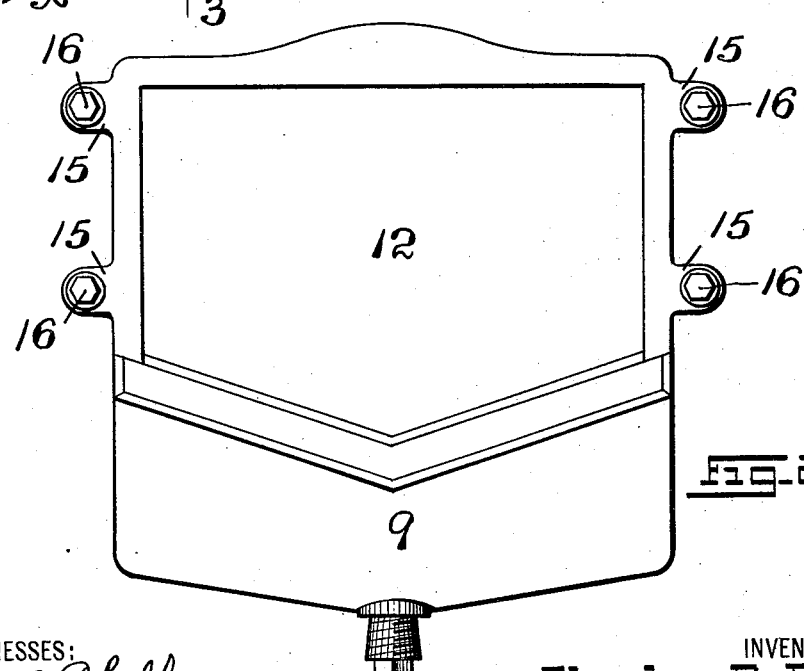

Figure 1 is a side elevation of the novel construction of self-oiling journal box, embodying the principles of the invention; and Fig. 2 is a front end view of the same. Fig. 3 is a transverse vertical cross-section of the same, said section being taken on line 3—3 in said Fig. 1, looking in the direction of the arrow x; and Fig. 4 is a longitudinal vertical section taken centrally through the self-oiling journal-box.

Similar characters of reference are employed in all of the hereinabove described views, to indicate corresponding parts.

Referring now to the said drawings, the reference-character 1 indicates the casing of a journal-box, the bottom wall 2 of which is constructed so as to form a slope extending downwardly from the inner end of the said casing toward the outer end thereof. The rear wall 3 of said casing is formed with the usual receiving space for connecting with the journal-box the usual wiper-plate 4. Said rear wall 3 is further provided with the usual openings 5 adapted to permit the passage therethrough and into the journal-box of a car-axle 6 and its journal-portion 7.

Arranged at the forward end of the casing 1, and suitably connected therewith, is an enlarged portion forming a reservoir-casing 8, said casing 8 being provided at its lower front portion with an inclosing wall 9, whereby a space 10 is formed at the lower end of said reservoir casing, thus providing a main or primary oil-reservoir, connecting with the interior of the said casing 1, and into which runs said downward slope of the lower or bottom wall 2 of the casing 1, whereby the oil used for lubricating purposes is returned to said main reservoir during the course of its circulation, and after the performance of its lubricating function. Said reservoir-casing 8 is provided with suitably disposed perforated ears or lugs 11. Arranged so as to inclose the opening of said reservoir casing 8, is a cover or plate 12 which is provided with an off-set or flange 13 at its lower edge, the same being adapted to engage operatively with an off-set or flange 14 with which the upper marginal edge-portion of the inclosing wall 9 is provided. Said cover-plate 12 is also provided with suitably disposed perforated ears or lugs 15 adapted to register with the ears or lugs 11, so that the registering parts may be secured together in their assembled relation by means of retaining bolts 16, or other suitable fastening means. The outer face of the exposed edges of the said reservoir-casing 8 is provided with a suitably formed channel or groove 17 adapted to receive a suitable packing or gasket 18, against which said cover-plate 12 is forced, when in its closing relation with the reservoir-casing 8, to provide a liquid-tight joint. The free end 19 of said journal-portion 7 projects into the interior of said reservoir-casing 8, and secured upon said free end 19 of said journal portion, by means of any suitable fastening means, such for example as the bolts 20, is a conveyer or disk-pump 21, which revolves with the revolving movements of said journal-portion 7 to which it is secured. Said conveyer or disk-pump 21 is provided at or upon its marginal edge-portions 22 with suitably formed and disposed oil-carrying members 23, preferably in the form of cups which, with said marginal edge-portions 22, are rotated into and through the body of oil contained in the main reservoir-portion or space of the reservoir-casing 8, when said conveyer or disk-pump is revolved. Located in the upper portion of said reservoir-casing 8 is a system of auxiliary reservoir-elements the same extending longitudinally through the upper portion of said reservoir-casing 8. The said auxiliary reservoir-elements comprise a pair of side-reservoir elements 24, the same being suitably secured to the side walls of said reservoir-casing 8, or they may be formed integrally therewith, if desired, and a central reservoir-element 25, which may be suitably secured to the rear wall 26 of the reservoir-casing 8, or may form an integral part of the same, as will be clearly evident. The said reservoir-elements are formed and arranged in such a manner, that their outer ends abut against and are closed by the said cover-plate 12, when the latter is assembled in its closing relation with the reservoir-casing 8, thus providing said reservoir-elements with a trough-like construction or formation. Both said side-reservoir elements 24 and said central reservoir-element 25 incline slightly in downward directions from their outer ends to a point where they join the rear wall 26 of the reservoir casing 8, the said reservoir-elements 24 being respectively provided in their bottom portions at points adjacent to said rear wall 26 with openings 27 27' which form suitable outlets, as will be clearly evident. Secured to or formed upon the rear wall 26 of the reservoir-casing 8, so as to register beneath the respective outlet-openings 27 of said side reservoir-elements 24, are a pair of inclined troughs or conveyer-ducts 28, which extend inwardly toward the center of said reservoir-casing 8, substantially as shown. The free ends of said troughs or ducts 28 terminate above a spout-member 29 which extends inwardly into said reservoir-casing 8 from a key or wedge-block 30 with which it is formed or connected. Secured to or formed upon the rear wall 26 of the reservoir-casing 8, beneath said central reservoir-element 25, and on either side of its outlet-opening 27', are a pair of vertical ribs 31 which provide an intervening guide-duct or channel 32 leading downwardly and registering above the spout-member 29 of said key or wedge block 30. Said key or wedge-block 30 is arranged between a suitable bearing-block 33 and the casing 1 of the journal-box, and serves to maintain in a proper operative relation with the journal-portion 7 and said journal-box, said bearing-block 33. Said bearing-block 33 is provided with suitably disposed ducts or passages 34 for conveying the oil or lubricant to said journal-portion 7, said key or wedge-block 30 being also provided with a passage or duct 35 which receives the oil or lubricant from said spout-members 29 and conveys the same to the bearing-block 33 and its ducts or passages 34. When said journal-portion 7 is revolving, it causes the operation of said conveyer or disk-pump 21, the oil-conveying-members 23 of which in passing through the main reservoir space and the oil therein, catching up the oil and flinging the same, by virtue of the centrifugal force, through the intervening spaces between said auxiliary reservoir-elements, thereby causing the same to become filled. The oil in said auxiliary side reservoir-elements 24 flows through their respective outlet-openings 27, and into the respective troughs or conveyer-ducts 28, whence it is conveyed to said spout-member 29, and thence conducted upon or to said journal-portion 7, through the various ducts or passages of said bearing-block 33. The oil drips from said journal-portion 7 and falls upon the inclined bottom wall 2 of the journal box or casing 1, whence it is returned to said main reservoir space. The oil caught and stored by said central reservoir-element 25 flows through its outlet-opening 27' and is conducted to the spout-member 29, by means of the guide-duct or channel 32 formed by the ribs 31. It will of course be clearly evident, that said auxiliary reservoir-elements maintain a sufficient store of lubricating material or oil, to keep the journal-portions 7 bathed and the oil in circulation during all normal stops of a car or other device with which the journal-boxes are connected. It will be apparent, that this function is of great importance, as thereby means for providing a perfect lubrication in cars, vehicles, or machinery is produced, and especially so where such cars, etc., are subjected in the normal course of their use to frequent startings and stoppings. The arrangement of the self-oiling journal-box embodying the principles of the present invention contemplates the use of auxiliary oil-reservoirs in combination with mechanism for filling the same from a main reservoir or supply, thus not only providing a continuous circulation of lubricant when the journal, shaft or axle is in motion, but continuing said oil-circulation for a period of time sufficient to cover all ordinary or normal stops in the movement of the journal, shaft or axle.

While in the drawings, I have shown, and in the specification I have described a central auxiliary reservoir-element, it must be understood, that its use is optional when the side reservoir-elements are provided; and, in fact, the use as an alternative construction of either the side reservoir-elements alone, or the central reservoir-elements alone, may be had without departing from the scope of the present invention; or, if desired, both types of reservoir-elements may be used in a single journal-box in the manner shown and described.

I am aware that changes may be made in the arrangements and combinations of the various parts, as well as in the details of the construction of the self-oiling journal-box hereinabve described, without departing from the scope of the present invention, as described in the foregoing specification, and as defined in the claims which are appended thereto. Hence, I do not limit my invention to the exact arrangements and combinations of the parts as set forth in the said specification, nor do I confine myself to the exact details of the construction of the said parts, as illustrated in the accompanying drawings.

I claim:—

1. A self-oiling journal-box comprising a main casing, a journal, a bearing-block provided with oil-passages, a key-block, a spout-member connected with said key-block, said key-block having a passage or duct connecting said spout-member with the oil-passages of said bearing-block, a reservoir-casing connected with said main casing, the same providing a main oil-reservoir in its lower portion, a pair of auxiliary side-reservoir elements arranged in the upper side-portions of said reservoir-casing, a central auxiliary reservoir-element arranged in the upper central portion of said reservoir-casing, each of said auxiliary side reservoir elements being provided with outlet-openings at their inner ends, trough-members upon the rear wall of said reservoir-casing, said trough-members lying under said respective outlet-openings of said auxiliary side reservoir-elements and adapted to conduct the oil therefrom to the spout-members of said key-block, vertical ribs arranged upon the rear wall of said reservoir-casing beneath said central auxiliary reservoir-element and adapted to form an intervening channel or duct below the outlet-opening of said central auxiliary reservoir-element communicating with the spout-member of said key-block, and means for carrying oil from said main reservoir to the said respective reservoir-elements, substantially as and for the purposes set forth.

2. A self-oiling journal-box comprising a main casing, a journal, a bearing-block provided with oil-passages, a key-block, a spout-member connected with said key-block, said key-block having a passage or duct connecting said spout-member with the oil-passages of said bearing-block, a reservoir-casing connected with said main casing, the same providing a main oil-reservoir in its lower portion, a pair of auxiliary side reservoir-elements arranged in the upper side-portions of said reservoir-casing, a central auxiliary reservoir-element arranged in the upper central portion of said reservoir-casing, each of said auxiliary side reservoir-elements being provided with outlet-openings at their inner ends, trough-members upon the rear wall of said reservoir-casing, said trough-members lying under said respective outlet-openings of said auxiliary side reservoir-elements and adapted to conduct the oil therefrom to the spout-members of said key-block, vertical ribs arranged upon the rear wall of said reservoir-casing beneath said central auxiliary reservoir-element and adapted to form an intervening channel or duct below the outlet-opening of said central auxiliary reservoir-element communicating with the spout-member of said key-block, means for carrying oil from said main reservoir to the said respective reservoir elements, a disk-pump secured upon the free end of said journal, and a plurality of oil-carrying members connected with said disk-pump, substantially as and for the purposes set forth.

In testimony, that I claim the invention set forth above I have hereunto set my hand this 10th day of January, 1911.

CHARLES F. BEERS.

Witnesses:
FREDK. C. FRAENTZEL,
FREDK. H. W. FRAENTZEL.

Copies of this patent may be obtained for five cents each, by addressing the "Commissioner of Patents, Washington, D. C."